United States Patent [19]

Crutzen et al.

[11] 4,359,903

[45] Nov. 23, 1982

[54] SYSTEM FOR THE IDENTIFICATION OF OBJECTS, FOR EXAMPLE NUCLEAR FUEL ELEMENTS

[75] Inventors: Serge Crutzen, Orino; Joseph Dal Cero, Brebbia; Rene Denis, Laveno, all of Italy

[73] Assignee: European Atomic Energy Community (EURATOM), Luxembourg

[21] Appl. No.: 138,347

[22] Filed: Apr. 8, 1980

[30] Foreign Application Priority Data

Apr. 24, 1979 [GB] United Kingdom ................ 7914203

[51] Int. Cl.[3] ........................................... G01N 29/00

[52] U.S. Cl. ....................................... 73/602; 376/249

[58] Field of Search ............ 73/602, 594; 176/19 LD; 250/506, 507; 376/249

[56] References Cited

U.S. PATENT DOCUMENTS

| | | | |
|---|---|---|---|
| 3,641,811 | 2/1972 | Gnaedinger et al. | 73/594 |
| 3,790,198 | 2/1974 | Hagen . | |
| 4,126,514 | 11/1978 | Wonn . | |

FOREIGN PATENT DOCUMENTS

| | | |
|---|---|---|
| 11635 | 8/1971 | Australia . |
| 1522644 | 4/1968 | France . |
| 2126794 | 10/1972 | France . |
| 1137519 | 12/1968 | United Kingdom . |
| 1241287 | 8/1971 | United Kingdom . |

OTHER PUBLICATIONS

Crutzen, S. J. et al., "Application of Tamper—Resistant Identification and Sealing Techniques for Safeguards", pp. 305–338.

*Primary Examiner*—Anthony V. Ciariante

*Attorney, Agent, or Firm*—Stevens, Davis, Miller & Mosher

[57] ABSTRACT

A system, suitable for use as an identity seal for an object, such as a container for fissile material, comprises a body including a cap for fitting over one end of the object, and a recess which contains a material such as "ARALDITE" or aluminium acting as a matrix for a plurality of inclusions of e.g. bronze embedded therein in a random configuration. The recess is closed by a cover which includes a central electrically conductive part. Also embedded in the matrix material and constituting further "inclusions" are two piezoelectric crystal transducers each electrically connected to the central cover part. In use, the transducers are electrically connected via the central cover part to external ultrasonic testing apparatus to provide a unique output indicative of the particular structure of the seal particularly the inclusion configuration and hence providing a unique "identity" and hence indication of integrity for the seal. Tampering with and/or removal of the seal will change its structure in some way so that subsequent ultrasonic testing produces a different output, revealing the occurrence of the unauthorized event.

6 Claims, 1 Drawing Figure

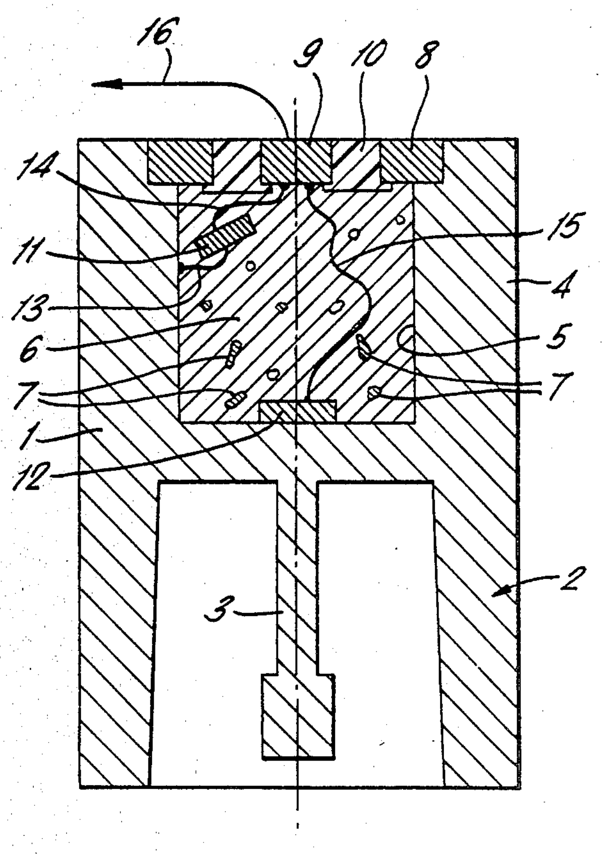
16
9
10
8
14
15
11
4
13
5
6
7
7
1
12
2
3

SYSTEM FOR THE IDENTIFICATION OF OBJECTS, FOR EXAMPLE NUCLEAR FUEL ELEMENTS

The invention is concerned with the identification of objects, for example, nuclear fuel elements, and is particularly but not exclusively concerned with the provision of a system for safeguarding such objects from fraud, i.e. tampering.

The identification of nuclear fuel elements and their protection from fraud is particularly important in view of the Treaty of Non Proliferation which requires that all fissile material must be inspected and controlled periodically, from its manufacture to its subsequent storage after use and reprocessing.

The fuel elements or other objects to be identified and controlled are usually provided with an identity seal which has the dual function of identifying each element or object, and the integrity of the identity seal guarantees the element from fraud, such as tampering therewith. Conveniently, an identity seal with a unique and non-reproducible identity is attached to a quantity of fuel in such a way that tampering will destroy the identity seal or modify its unique identity and hence reveal the occurrence of an event which may have been accompanied by an alteration of the material sealed thereby, or alternatively substitution of some of the material sealed thereby. Several types of identity seals have been previously developed and applied, for example an identity seal which encloses the two extremities of a security wire, and is composed of two parts which are closed together by a non-return system. Another type of identity seal is made of epoxy resin containing inclusions of metallic material for blocking the two extremities of a security wire, the detection of the position of the randomly placed inclusions, and hence the identity code of the identity seal, being made by transparency photography.

Another type of identity seal is constituted by a pressure sensitive label, being generally used for sealing containers or doors. This type of identity seal is usually made of paper coated with vinyl plastics, whose surface is printed with regular and fine design to reveal erasures. The backing adhesive and ink of the identity seal are chosen to resist without damage all the chemicals normally present in the environment within which the identity seal is to be used. Any chemical used when the identity seal is tampered with to destroy the adhesive should also destroy the label or its printing.

A further type of identity seal is described in our British Patent Specification No. 1,241,287, in which the unique identity code of the identity seal is provided by means of a plurality of marks arranged in a random configuration which is practically impossible to reproduce. The marks are constituted by inclusions of foreign matter, for example tungsten particles, in a matrix of aluminum, which are disposed within the seal itself. By ultrasonic testing, the presence of the inclusions and their pattern can be recorded, being the identity code of the seal, so that if subsequently the identity seal is tested ultrasonically and the resulting output differs from that originally recorded, there is a direct indication that the identity seal has been altered or changed, i.e. tampered with, and its integrity breached. Depending on the type of identity seal and its use, the inclusions may be constituted either by particles, or by holes in the matrix. The output signals produced by the ultrasonic testing are recorded in analog form, so that the outputs obtained are easy to interprete, and either the entire output for a particular identity seal, or a significant part thereof may be used as the identity code for that seal. The analog data may be converted into digital form for automatic storage and checking, and it is possible at any time to bring up to date the recorded data, to recall and print out particular results of ultrasonic scanning, and obtain a print-out of the physical situation of all the fissile material under a particular control programme.

However, to detect the identity code of this latter type of identity seal using ultrasonic testing requires that the ultrasonic transducer must be exactly positioned on the seal each time it is scanned. A slight difference in the positioning may alter the output obtained, with a result that although the seal may be untouched, the result obtained may falsely indicate that there has been tampering. This accuracy in position may be difficult to achieve when for example the identity seal is attached to fissile elements stored in a basin and covered by six meters of water, as is common in storage ponds for nuclear fuel elements before reprocessing.

Other types of identity seals may be identified using a film or TV camera, but the distance between the object and the observer, and the frequently poor illumination of the sight require high resolution telescopes and periscopes, quite apart from the fact that in many cases there is the added hazard of radiation.

According to the present invention, there is provided a system for the identification of an object comprising a material matrix, a plurality of inclusions located within said material matrix in a random configuration, at least one of the inclusions being constituted by a piezo electric crystal transducer, and means for providing electrical connection between the or each transducer and external ultrasonic testing apparatus when the system is, in use, associated with an object to be identified, thereby to produce an output which is unique to the particular configuration of said inclusions within the material matrix.

According to a preferred embodiment of the invention, the system is adapted to constitute an identity seal for incorporation within or attachment to an object thereby to provide an indication of the identity of the object and also an indication of the integrity of at least a part of said object when the or each transducer is, in use, connected to exterior ultrasonic testing apparatus. Thus according to the preferred embodiment of the invention, there is provided an identity seal which can be readily and rapidly identified and its integrity inspected using a simple electrical connection, without requiring the performance of difficult and expensive operations. Because the or each transducer will always transmit the ultrasonic "picture" which it senses within the seal construction, it will always transmit the same identity of the seal provided that there has been no tampering, and because there is no need for accurate positioning of the external ultrasonic testing equipment, the results obtained are far more reliable than with other types of identity seal.

Moreover, there is an added advantage in an identity seal incorporating a system according to the present invention, because the characteristics of the or each transducer embedded within the matrix adds a further degree of randomness to the identity of the seal, which of course makes the identity of the seal even more difficult, if not impossible, to reproduce.

Because all the operations for positioning a transducer near the identity seal are no longer required, thereby dispensing with the uncertainties and errors resulting from inaccurate positioning, it is not necessary that the transducer or transducers embedded within the matrix be of high quality, since a simple piezo electric crystal may be sufficient because its response to ultrasonic testing will always be the same provided that there has been no tampering.

One embodiment of the invention will now be described, by way of example, with reference to the accompanying drawing of which the sole FIGURE illustrates diagrammatically a vertical section of an identity seal for use with a bundle of nuclear fuel elements.

In the drawing, the seal comprises a body 1, of which the lower end 2 constitutes a cap for covering one end of a stud (not shown) which is part of an object which is to be monitored, e.g. a container of fissile material. In the centre of the inside surface of the cap 2, there is provided a projection 3, which constitutes a fixing element for engaging the end portion of the stud, the projection 3 being adapted to be broken upon subsequent removal of the cap 2 from the monitored object.

The upper portion 4 of the body 1 is provided with a cylindrical recess 5 which is filled by a material 6 such as "ARALDITE", or possibly aluminium, in which are embedded in a random configuration inclusions 7 of bronze or tungsten. The mouth of the recess 5 is closed off by a cover 8 which is predominantly made of electrically conductive material; preferably the body 1 is made of the same electrically conductive material as the major part of the cover 8. The cover 8 has a central portion 9 which is electrically conductive, and which is completely surrounded by an annular member 10 of electrically insulating material extending completely through the thickness of the cover 8.

Also embedded within the material 6 (which constitutes a matrix for the inclusions 7), are two piezo electric transducers 11, 12, which each constitute a further inclusion in the matrix material. Transducer 11 is wholly embedded within the matrix material, being electrically connected by a lead 13 to one wall of the recess 5, and by a further lead 14 to the electrically conductive central part 9 of the cover 8. The second transducer 12, on the other hand, is directly mounted, e.g. by welding, to a wall of the recess 5, and is electrically connected by a lead 15 to the electrically conductive central part 9 of the cover 8.

Accordingly, when exterior ultrasonic testing apparatus, which does not itself form part of the invention, is electrically connected to the central part 9 of the cover 8, the transducers 11 and 12 within the matrix material 6 will provide an output which is indicative of the structure of the seal and particularly the configuration of the various inclusions. This connection of the exterior ultrasonic testing apparatus may be made directly, or alternatively, if the objects to be identified are remote from the ultrasonic testing apparatus, this connection may be made by a conductor lead 16 connected to the central part 9 of the cover 8. Provided that the identity seal has not been tampered with, or even completely removed, the output from the transducers 11 and 12 will be always the same, giving the identity code of this particular seal. Tampering with the seal or removal of the cap will alter its structure, so that subsequent testing will produce a different result from the transducers 11 and 12, indicating the occurrence of such an unauthorised event.

It should be noted that although the inclusions 7 have been described above as being of bronze or tungsten, at least some of them may be alternatively constituted by voids in the matrix material.

We claim:

1. A system for identifying an object or providing an indication of tampering with said object comprising:

a hollow body adapted for attachment to said object;

a matrix material located in said hollow body;

a plurality of inclusions located within said matrix material in a random configuration, at least one of said inclusions being a piezoelectric transducer; and, at least one electrically conductive exterior portion forming part of the exterior profile of said body, said exterior portion being electrically connected to said piezoelectric transducer such that said transducer may be connected to an external ultrasonic testing apparatus by means of said electrically conductive exterior portion.

2. A system as claimed in claim 1, in which said body comprises a first body member having a recess therein which contains said material matrix, and a second body member constituting a cover which closes off the mouth of the recess, said electrically conductive exterior portion of the body being located in said cover.

3. A system as claimed in claim 2, wherein said first body member is formed of conductive material and in which two of said inclusions are each constituted by a piezo electric crystal transducer, one of said transducers being connected by respective electrical leads to the wall of the recess and to the electrically conductive exterior portion of the cover, and the other transducer being mounted directly on the recess wall and connected by a further electrical lead to said electrically conductive exterior portion of the cover.

4. A system as claimed in claim 2 or claim 3, in which said cover comprises a central electrically conductive part constituting said electrically conductive exterior portion, and an annular member of electrically insulating material which surrounds the periphery of said central part.

5. A system as claimed in claim 1, in which said body further includes a cap adapted for attachment to a container for containing fissile material.

6. A system as claimed in claim 5, in which the cap includes a projection adapted for engagement with said container when the cap is attached thereto so as to be breakable upon subsequent removal of the cap.

* * * * *